United States Patent
Yashiki et al.

(10) Patent No.: US 6,806,222 B2
(45) Date of Patent: Oct. 19, 2004

(54) SOLID TITANIUM CATALYST COMPONENT, ETHYLENE POLYMERIZATION CATALYST CONTAINING THE SAME, AND ETHYLENE POLYMERIZATION PROCESS

(75) Inventors: Tsuneo Yashiki, Waki-cho (JP); Shuji Minami, Waki-cho (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/025,548

(22) Filed: Dec. 26, 2001

(65) Prior Publication Data

US 2002/0082160 A1 Jun. 27, 2002

Related U.S. Application Data

(63) Continuation of application No. 08/651,492, filed on May 22, 1996.

(30) Foreign Application Priority Data

May 22, 1995 (JP) .............................................. 7-122865
Apr. 8, 1996 (JP) .............................................. 8-85527

(51) Int. Cl.$^7$ ............................ C08F 6/602; C08F 6/605
(52) U.S. Cl. .................... 502/116; 502/125; 526/124.9; 526/125.1; 526/352
(58) Field of Search ................................. 502/116, 125, 502/134, 132, 133; 526/124.9, 125.1, 352

(56) References Cited

U.S. PATENT DOCUMENTS 4,891,411 A * 1/1990 Sasaki et al.
4,952,649 A * 8/1990 Kioka et al.
5,278,118 A * 1/1994 Cuffiana et al.

* cited by examiner

*Primary Examiner*—Caixia Lu
(74) *Attorney, Agent, or Firm*—Sherman & Shalloway

(57) ABSTRACT

Disclosed is a solid titanium catalyst component which is obtained by a process comprising the steps of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a), elevating the temperature of the resulting contact product to a temperature of 105 to 115° C. and maintaining the contact product at this temperature. The contact product may be further brought into contact with not more than 0.5 mol of the organosilicon compound having no active hydrogen (c). Also disclosed are an ethylene polymerization catalyst formed from the solid titanium catalyst component and an organometallic compound and an ethylene polymerization process using the catalyst. By the use of the solid titanium catalyst component, ethylene can be polymerized with high activities and an ethylene polymer having excellent particle properties can be prepared.

9 Claims, 1 Drawing Sheet

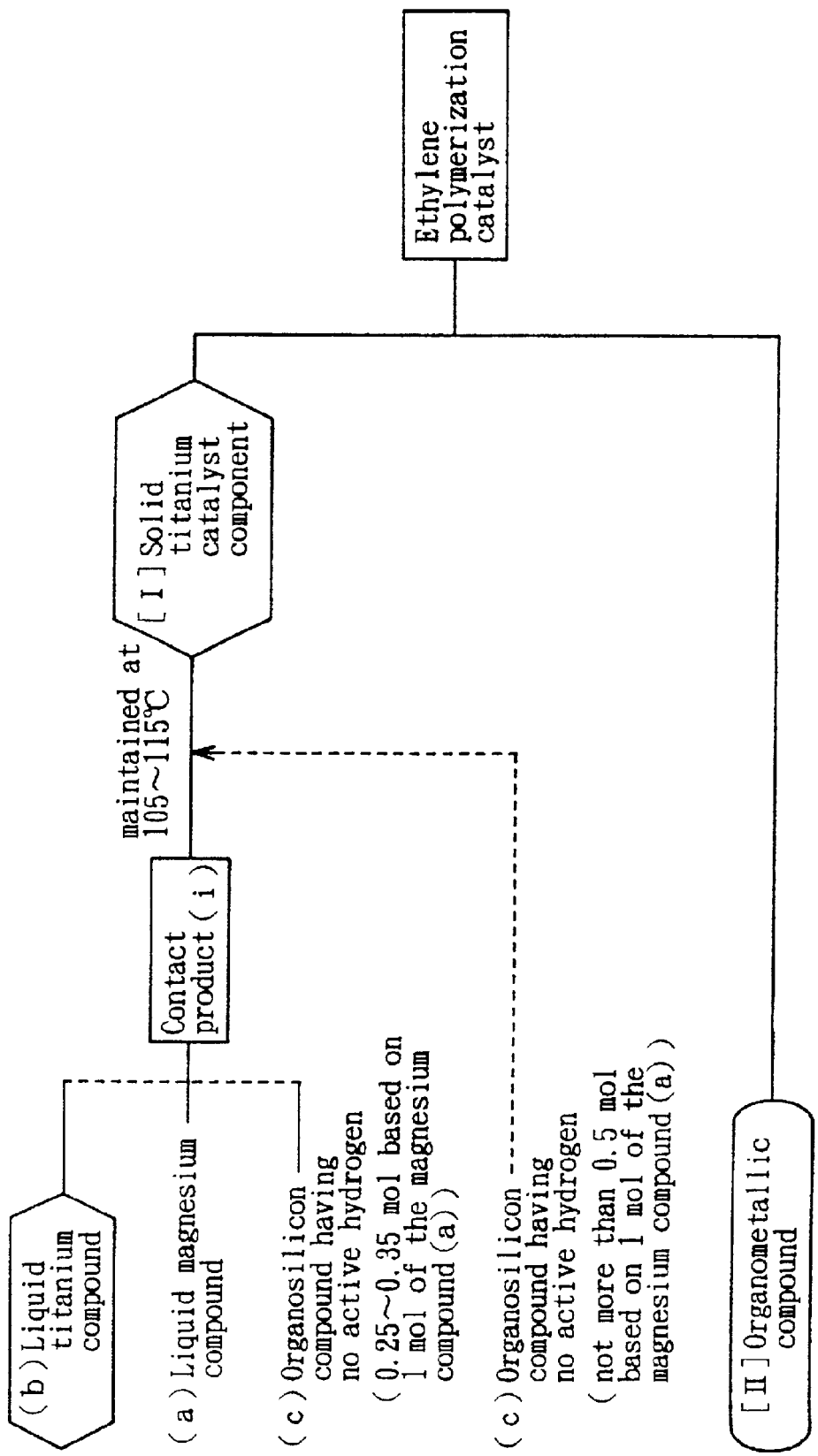

SOLID TITANIUM CATALYST COMPONENT, ETHYLENE POLYMERIZATION CATALYST CONTAINING THE SAME, AND ETHYLENE POLYMERIZATION PROCESS

This application is a continuation of application Ser. No. 08/651,492, filed on May 22, 1996, which claims priority from JP 122865/1995 filed on May 22, 1995 and JP 85527/1996 filed on Apr. 8, 1996.

FIELD OF THE INVENTION

The present invention relates to a solid titanium catalyst component capable of polymerizing ethylene with high activities and preparing an ethylene polymer of excellent particle properties, and also relates to an ethylene polymerization catalyst containing the solid titanium catalyst component and an ethylene polymerization process using the catalyst.

BACKGROUND OF THE INVENTION

Ethylene polymers such as homopolyethylene and linear low density polyethylene (LLDPE) have been widely used for films, because of their excellent transparency and mechanical strength.

Various processes to prepare the ethylene polymers have been conventionally proposed, and it is known that the ethylene polymers can be prepared with high polymerization activities when Ziegler catalyst comprising titanium, magnesium, halogen and optionally an electron donor is used as a polymerization catalyst. It is also known that high activities are exhibited especially when a solid titanium catalyst component obtained from a halogen-containing magnesium compound in a liquid state, a liquid titanium compound and an electron donor is used as a titanium catalyst component.

In these processes to prepare ethylene polymers, if ethylene is polymerized with much higher activities, not only the productivity is raised, but also the amount of the catalyst residue per polymer unit, particularly halogen content, is reduced, whereby a problem of mold rusting in the molding process can be solved. Therefore, development of a titanium catalyst component capable of polymerizing ethylene with much higher activities is desired.

The ethylene polymers obtained immediately after the polymerization are generally in the form of powder even if the polymerization is carried out by a slurry polymerization process or a gas phase polymerization process, and in this case it is desired that ethylene polymers having good fluidity, containing no finely divided powder and having an excellent particle size distribution are produced. The ethylene polymers showing such excellent particle properties have various advantages, for example, they can be used as they are depending on the purpose, even if they are not pelletized.

OBJECT OF THE INVENTION

The present invention has been made under such circumstances as described above, and it is an object of the invention to provide a solid titanium catalyst component by which ethylene can be polymerized with high activities and an ethylene polymer of excellent particle properties can be prepared. It is another object of the invention to provide an ethylene polymerization catalyst containing the solid titanium catalyst component and an ethylene polymerization process using the catalyst.

SUMMARY OF THE INVENTION

A solid titanium catalyst component according to the invention is obtained by a process comprising a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a) and a step of elevating the temperature of the resulting contact product (i) to a temperature of 105 to 115° C. and maintaining the contact product (i) at this temperature, and comprises magnesium, titanium, halogen and the organosilicon compound having no active hydrogen (c).

A solid titanium catalyst component comprising those ingredients mentioned above can be obtained also by a process comprising a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a) and a step of elevating the temperature of the resulting contact product (i) to maintain the contact product (i) at a given temperature of 105 to 115° C., wherein the organosilicon compound having no active hydrogen (c) is added in an amount of not more than 0.5 mol based on 1 mol of the magnesium compound (a) while the temperature of the contact product (i) is elevated from a temperature lower by 10° C. than the temperature maintained to a temperature at which the elevation of the temperature is completed, or after the elevation of the temperature is completed, so as to bring the compound (c) into contact with the contact product (i).

An ethylene polymerization catalyst according to the invention is formed from [I] the above-mentioned solid titanium catalyst component and [II] an organometallic compound.

In an ethylene polymerization process according to the invention, ethylene is polymerized or ethylene and a comonomer are copolymerized in the presence of the above-mentioned catalyst.

BRIEF DESCRIPTION OF THE DRAWING

FIG. 1 shows steps for preparing a solid titanium catalyst component according to the invention and shows steps for preparing an ethylene polymerization catalyst according to the invention.

DETAILED DESCRIPTION OF THE INVENTION

A solid titanium catalyst component, an ethylene polymerization catalyst containing the catalyst component and the ethylene polymerization process according to the invention are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

In FIG. 1, steps for preparing the solid titanium catalyst component according to the invention and steps for preparing the ethylene polymerization catalyst containing the catalyst component are shown.

[I] Solid Titanium Catalyst Component

The solid titanium catalyst component according to the invention is obtained by bringing (a) a liquid magnesium compound, (b) a liquid titanium compound and (c) an organosilicon compound having no active hydrogen in a specific amount based on 1 mol of the magnesium compound (a) into contact with each other in the manner described later, and comprises magnesium, titanium, halogen and the organosilicon compound having no active hydrogen (c).

First, each ingredient used for preparing the solid titanium catalyst component of the invention is described below.

(a) Liquid Magnesium Compound

In the preparation of the solid titanium catalyst component of the invention, the magnesium compound is used in a liquid state. When the magnesium compound is solid, it is made liquid prior to use.

As the magnesium compound, any of (a-1) a magnesium compound having reduction ability and (a-2) a magnesium compound having no reduction ability can be used.

The magnesium compound having reduction ability (a-1) is, for example, an organomagnesium compound represented by the following formula:

wherein n is a number of $0 \leq n < 2$; R is hydrogen, an alkyl group of 1 to 20 carbon atoms, an aryl group or a cycloalkyl group; when n is 0, two of R may be the same as or different from each other; and X is halogen.

Examples of the organomagnesium compounds having reduction ability include:

dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylmagnesium chloride, butylmagnesium chloride, hexylmagnesium chloride and amylmagnesium chloride;

alkylmagnesium alkoxides, such as butylethoxymagnesium, ethylbutoxymagnesium and octylbutoxymagnesium; and other compounds, such as butylmagnesium hydride.

Examples of the magnesium compounds having no reduction ability (a-2) include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium;

magnesium carboxylates, such as magnesium laurate and magnesium stearate;

metallic magnesium; and magnesium hydrides.

The magnesium compounds having no reduction ability (a-2) may be compounds derived from the aforementioned magnesium compounds having reduction ability (a-1) or compounds derived in the course of the process for preparing the catalyst component. For deriving the magnesium compounds having no reduction ability (a-2) from the magnesium compounds having reduction ability (a-1), for example, the magnesium compounds having reduction ability (a-1) are brought into contact with alcohols, ketones, esters, ethers, siloxane compounds, halogen-containing compounds such as halogen-containing silane compounds, halogen-containing aluminum compounds and acid halides, or compounds having OH group or active carbon-to-oxygen bond.

In the present invention, the magnesium compounds having no reduction ability (a-2) can be derived from the magnesium compounds having reduction ability (a-1) using the later-described organosilicon compound having no active hydrogen (c).

The magnesium compounds can be used in combination of two or more kinds.

The magnesium compounds may form complex compounds or double compounds together with organometallic compounds of other metals such as aluminum, zinc, boron, beryllium, sodium and potassium (e.g., later-described organoaluminum compound), or may be mixed with these metallic compounds.

In the preparation of the solid titanium catalyst component [I], other magnesium compounds than the above-mentioned ones are employable, but it is preferred that the magnesium compound is present in the form of a halogen-containing magnesium compound in the finally obtained solid titanium catalyst component [I]. Therefore, if a magnesium compound containing no halogen is used, the magnesium compound is preferably contacted with a halogen-containing compound in the course of the process to prepare the catalyst component.

Of the above compounds, the magnesium compounds having no reduction ability, particularly those containing halogen, are preferred. Among them, more preferred are magnesium chloride, alkoxymagnesium chloride and aryloxymagnesium chloride.

When the magnesium compound is solid, the solid magnesium compound can be made liquid using an electron donor (d-1).

The electron donor (d-1) includes alcohols, carboxylic acids, aldehydes, amines and metallic acid esters.

Examples of the alcohols include:

aliphatic alcohols, such as methanol, ethanol, propanol, isopropyl alcohol, butanol, pentanol, hexanol, 2-methylpentanol, 2-ethylbutanol, heptanol, 2-ethylhexanol, octanol, decanol, dodecanol, tetradecyl alcohol, octadecyl alcohol, undecenol, oleyl alcohol, stearyl alcohol and ethylene glycol;

alicyclic alcohols, such as cyclohexanol and methylcyclohexanol;

aromatic alcohols, such as benzyl alcohol, methylbenzyl alcohol, isopropylbenzyl alcohol, α-methylbenzyl alcohol, α,α-dimethylbenzyl alcohol, phenylethyl alcohol, cumyl alcohol, phenol, cresol, xylenol, ethylphenol, propylphenol, nonylphenol and naphthol;

alkoxy group-containing alcohols, such as n-butyl cellosolve, ethyl cellosolve, 1-butoxy-2-propanol and methylcarbitol; and halogen-containing alcohols, such as trichloromethanol, trichloroethanol and trichlorohexanol.

The carboxylic acids are preferably those having 7 or more carbon atoms, for example, caprylic acid, 2-ethylhexanoic acid, nonylic acid and undecylenic acid.

The aldehydes are preferably those having 7 or more carbon atoms, for example, caprylaldehyde, 2-ethylhexylaldehyde, undecylaldehyde, benzaldehyde, tolualdehyde and naphthaldehyde.

The amines are preferably those having 6 or more carbon atoms, for example, heptylamine, octylamine, 2-ethylhexylamine, nonylamine, decylamine, undecylamine and laurylamine.

Examples of the metallic acid esters include tetraethoxytitanium, tetra-n-propoxytitanium, tetra-i-propoxytitanium, tetrabutoxytitanium, tetrahexoxytitanium, tetrabutoxyzirconium and teraethoxyzirconium. The metallic acid esters do not include silicic acid esters which are described later as examples of the organosilicon compound having no active hydrogen (c).

The electron donors mentioned above can be used in combination of two or more kinds, or they can be used in combination with the later-described other electron donors (d) than the above-mentioned electron donors.

Of these, preferred are alcohols and metallic acid esters, and particularly preferred are alcohols of 6 or more carbon atoms.

If an electron donor having 6 or more carbon atoms is used as the electron donor (d-1) in order to make the magnesium compound liquid, the amount thereof is usually not less than 1 mol, preferably 1 to 40 mol, more preferably 1.5 to 12 mol, based on 1 mol of the magnesium compound. If an electron donor having 5 or less carbon atoms is used as the electron donor (d-1), the amount thereof is usually not less than 15 mol based on 1 mol of the magnesium compound.

In the contact of the solid magnesium compound and the electron donor (d-1), a hydrocarbon solvent can be used. Examples of the hydrocarbon solvents include aliphatic hydrocarbons, such as pentane, hexane, heptane, octane, decane, dodecane, tetradecane and kerosine; alicyclic hydrocarbons, such as cyclopentane, methylcyclopentane, cyclohexane, methylcyclohexane, cyclooctane and cyclohexene; aromatic hydrocarbons, such as benzene, toluene, xylene, ethylbenzene, cumene and cymene; and halogenated hydrocarbons, such as carbon tetrachloride, dichloroethane, dichloropropane, trichloroethylene and chlorobenzene.

When the aromatic hydrocarbons are used from among these solvents, the alcohol as the electron donor (d-1) is used in the same amount as defined above in the case of the electron donor of 6 or more carbon atoms, regardless of the type (number of carbon atoms) of the alcohol used, whereby the magnesium compound can be dissolved. When the aliphatic hydrocarbons and/or the alicyclic hydrocarbons are used, the alcohol as the electron donor (d-1) is used in the above-mentioned amount according to the number of the carbon atoms.

In the present invention, it is preferred that the solid magnesium compound is contacted with the electron donor (d-1) in the hydrocarbon solvent.

In order to dissolve the solid magnesium compound in the electron donor (d-1), a method of contacting the solid magnesium compound with the electron donor (d-1), preferably in the presence of the hydrocarbon solvent, and heating them if necessary is generally adopted. This contact is carried out at a temperature of usually 0 to 300° C., preferably 20 to 180° C., more preferably 50 to 150° C., for about 15 minutes to 5 hours, preferably about 30 minutes to 2 hours.

(b) Liquid Titanium Compound

In the present invention, a tetravalent titanium compound is preferably used as the liquid titanium compound. The tetravalent titanium compound is, for example, a compound represented by the following formula:

$$Ti(OR)_g X_{4-g}$$

wherein R is a hydrocarbon group, X is a halogen atom, and $0 \leq g \leq 4$.

Examples of such compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(On-C_4H_9)Cl_3$, $Ti(OC_2H_5)Br_3$ and $Ti(O\text{-iso-}C_4H_9)Br_3$;

dialkoxytitanium dihalides, such as $Ti(OCH_3)_2Cl_2$, $Ti(OC_2H_5)_2Cl_2$, $Ti(On-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(On-C_4H_9)_3Cl$ and $Ti(OC_2H_5)_3Br$; and tetraalkoxytitaniums, such as $Ti(OCH_3)_4$, $Ti(OC_2H_5)_4$, $Ti(On-C_4H_9)_4$, $Ti(O\text{-iso-}C_4H_9)_4$ and $Ti(O\text{-2-ethylhexyl})_4$.

Of these, preferred are titanium tetrahalides, and particularly preferred is titanium tetrachloride. These titanium compounds can be used in combination of two or more kinds. Further, these titanium compounds may be diluted with the above-exemplified hydrocarbon solvents which are used for making the magnesium compound (a) liquid.

(c) Organosilicon Compound Having No Active Hydrogen

The organosilicon compound having no active hydrogen, which is used in the invention, is represented by, for example, the formula $R^1_x R^2_y Si(OR^3)_z$ ($R^1$ and $R^2$ are each independently a hydrocarbon group or halogen, $R^3$ is a hydrocarbon group, $0 \leq x < 2$, $0 \leq y < 2$, and $0 < z \leq 4$).

Examples of the organosilicon compounds represented by the above formula include:

tetramethoxysilane, tetraethoxysilane, tetrapropoxysilane, tetrabutoxysilane, tetrakis(2-ethylhexyloxy)silane, ethyltrimethoxysilane, ethyltriethoxysilane, vinyltrimethoxysilane, methyltrimethoxysilane, n-propyltriethoxysilane, decyltrimethoxysilane, cyclopentyltrimethoxysilane, 2-methylcyclopentyltrimethoxysilane, 2,3-dimethylcyclopentyltrimethoxysilane, cyclohexyltrimethoxysilane, 2-norbornanetrimethoxysilane, 2-norbornanemethyldimethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, decyltriethoxysilane, cyclopentyltriethoxysilane, cyclohexyltriethoxysilane, 2-norbornanetriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane), vinyltriacetoxysilane, dimethyldimethoxysilane, diisopropyldimethoxysilane, t-butylmethyldimethoxysilane, dicyclopentyldimethoxysilane, bis(2-methylcyclopentyl)dimethoxysilane, bis(2,3-dimethylcyclopentyl)dimethoxysilane, dicyclohexyldimethoxysilane, cyclohexylmethyldimethoxysilane, diphenyldimethoxysilane, phenylmethyldimethoxysilane, bis-o-tolyldimethoxysilane, bis-m-tolyldimethoxysilane, bis-p-tolyldimethoxysilane, bisethylphenyldimethoxysilane, dimethyldiethoxysilane, t-butylmethyldiethoxysilane, t-amylmethyldiethoxysilane, dicyclopentyldiethoxysilane, diphenyldiethoxysilane, bis-p-tolyldiethoxysilane, cyclohexylmethyldiethoxysilane, trimethylmethoxysilane, trimethylethoxysilane, tricyclopentylmethoxysilane, tricyclopentylethoxysilane, dicyclopentylmethylmethoxysilane, dicyclopentylethylmethoxysilane, hexenyltrimethoxysilane, cyclopentyldimethylmethoxysilane, cyclopentyldiethylmethoxysilane, dicylopentylmethylethoxysilane, cyclopentyldimethylethoxysilane and dimethyltetraethoxydisiloxane.

Of these, preferably used are tetramethoxysilane, tetraethoxysilane and cyclohexylmethyldimethoxysilane. From the viewpoint of catalytic activity, tetraethoxysilane is particularly preferably used.

In the present invention, it is enough that the organosilicon compound having no active hydrogen (c) is contained in the finally obtained solid titanium catalyst component. In the preparation of the solid titanium catalyst component, therefore, the organosilicon compound having no active hydrogen (c) itself may not be used, and there can be used compounds capable of producing the organosilicon compound having no active hydrogen in the course of the process for preparing the solid titanium catalyst component.

(d) Other Electron Donor

In the preparation of the solid titanium catalyst component of the invention, an electron donor having no active hydrogen (d) may be optionally used in addition to the organosilicon compound having no active hydrogen (c).

Examples of such electron donors (d) include organic acid esters, organic acid halides, organic acid anhydrides, ethers, ketones, tertiary amines, phosphorous acid esters, phosphoric acid esters, carboxylic acid amides, nitriles, aliphatic carbonates and pyridines. More specifically, there can be mentioned:

organic acid esters having 2 to 18 carbon atoms, such as methyl formate, methyl acetate, ethyl acetate, vinyl acetate, propyl acetate, i-butyl acetate, t-butyl acetate, octyl acetate, cyclohexyl acetate, methyl chloroacetate, ethyl dichloroacetate, ethyl propionate, ethyl pyruvate, ethyl pivalate, methyl butyrate, ethyl valerate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate and ethyl ethoxybenzoate;

acid halides having 2 to 15 carbon atoms, such as acetyl chloride, benzoyl chloride and toluyl chloride;

acid anhydrides, such as acetic anhydride, phthalic anhydride, maleic anhydride, benzoic anhydride, trimellitic anhydride and tetrahydrophthalic anhydride;

ethers having 2 to 20 carbon atoms, such as methyl ether, ethyl ether, isopropyl ether, butyl ether, amyl ether, tetrahydrofuran, ethyl benzyl ether, ethylene glycol dibutyl ether, anisole and diphenyl ether;

ketones having 3 to 20 carbon atoms, such as acetone, methyl ethyl ketone, methyl isobutyl ketone, ethyl n-butyl ketone, acetophenone, benzophenone, benzoquinone and cyclohexanone;

tertiary amines, such as trimethylamine, triethylamine, tributylamine, tribenzylamine and tetramethylethylenediamine;

phosphorous acid esters, such as trimethyl phosphite, triethyl phosphite, tri-n-propyl phosphite, triisopropyl phosphite, tri-n-butyl phosphite, triisobutyl phosphite, diethyl-n-butyl phosphite and diethylphenyl phosphite;

phosphoric acid esters, such as trimethyl phosphate, triphenyl phosphate and tritolyl phosphate;

acid amides, such as N,N-dimethylacetamide, N,N-diethylbenzamide and N,N-dimethyltoluamide;

nitriles, such as acetonitrile, benzonitrile and tolunitrile;

aliphatic carbonates, such as dimethyl carbonate, diethyl carbonate and ethylene carbonate; and pyridines, such as pyridine, methylpyridine, ethylpyridine and dimethylpyridine.

These compounds can be used in combination of two or more kinds.

Preparation of Solid Titanium Catalyst Component

In the present invention, the solid titanium catalyst component [I] can be prepared from the above ingredients by the following processes.

(1) The liquid magnesium compound (a) and the liquid titanium compound (b) are contacted in the presence of the organosilicon compound having no active hydrogen (c) (referred to simply as "organosilicon compound (c)" hereinafter) in an amount of 0.25 to 0.35 mol based on 1 mol of the magnesium compound (a). Then, the temperature of the resulting contact product (i) is elevated to a temperature of 105 to 115° C. and maintained at this temperature.

(2) The temperature of the contact product (i) obtained above is elevated to maintain the contact product (i) at a temperature of 105 to 115° C., and in this step, the organosilicon compound (c) is added in an amount of not more than 0.5 mol based on 1 mol of the magnesium compound (a) while the temperature of the contact product (i) is elevated from a temperature lower by 10° C. than the temperature maintained to a temperature at which the elevation of the temperature is completed, or after the elevation of the temperature is completed, so as to contact the organosilicon compound (c) with the contact product (i).

Of the above processes, the process (2) is preferred from the viewpoint of catalytic activity of the resulting solid titanium catalyst component.

According to the invention, in the contact of the components, the organosilicon compound (c) is used in a specific amount based on the magnesium compound (a).

It is preferred that the titanium compound (b) is used in such a sufficient amount that a solid can be precipitated by the contact even if any special precipitating means is not adopted. The amount of the titanium compound (b) used varies depending on the kind thereof, contact conditions, the amount of the organosilicon compound (c), etc., but it is usually not less than 1 mol, preferably about 5 to 200 mol, more preferably about 10 to 100 mol, based on 1 mol of the magnesium compound (a). Further, the titanium compound (b) is used in an amount of preferably more than 1 mol, more preferably not less than 5 mol, based on 1 mol of the organosilicon compound (c).

The above processes are described below in more detail.

The liquid magnesium compound (a) and/or the titanium compound (b), which are to be contacted with each other, may preliminarily contain the organosilicon compound (c). In this case, the organomagnesium compound (c) may not be added in the contact step of the magnesium compound (a) and the titanium compound (b), but it may be added. In any case, the total amount of the organosilicon compound (c) based on the magnesium compound (a) is within the above range.

In the present invention, the contact of the liquid magnesium compound (a) and the liquid titanium compound (b) is carried out at such a low temperature that a solid is not rapidly produced by the contact. Specifically, the contact is desirably carried out at a temperature of −70 to +50° C., preferably −50 to +30° C., more preferably −40 to +20° C. The temperatures of each solutions used for the contact may be different from each other. If the contact temperature is too low to precipitate a solid in a contact product (i) in the beginning of the contact, the contact at the low temperature can be carried out for a long period of time to precipitate a solid.

The temperature of the contact product (i) obtained above is then slowly elevated to a temperature of 105 to 115° C. so as to precipitate a solid gradually, followed by maintaining this temperature.

The time for maintaining the temperature is in the range of usually 0.5 to 6 hours, preferably 1 to 4 hours.

The time required for elevating the temperature greatly varies depending on the scale of the reactor, etc.

When the liquid magnesium compound (a) and the liquid titanium compound (b) are contacted under the above conditions in the presence of the organosilicon compound having no active hydrogen (c), a granular or spherical solid titanium catalyst component having relatively large particle diameters and an excellent particle size distribution can be obtained. When ethylene is subjected to slurry polymerization using the solid titanium catalyst component of such excellent particle properties, a granular or spherical ethylene polymer having an excellent particle size distribution, a high bulk density and good fluidity can be obtained.

According to the process (2), in the step of the process (1) wherein the temperature of the contact product (i) is elevated to a temperature of 105 to 115° C. and maintained at this temperature for usually 0.5 to 6 hours, preferably 1 to 4 hours, the organosilicon compound (c) is added in an amount of not more than 0.5 mol based on 1 mol of the magnesium compound (a) while the temperature of the contact product (i) is elevated from a temperature lower by 10° C. than the temperature maintained to a temperature at which the elevation of the temperature is completed, or after (preferably, immediately after) the elevation of the temperature is completed, so as to contact the organosilicon compound (c) with the contact product (i).

The solid titanium catalyst component of the invention prepared by the above processes comprises magnesium, titanium, halogen and the organosilicon compound having no active hydrogen (c).

In the solid titanium catalyst component, it is desired that:

a magnesium/titanium ratio (by atom) is in the range of about 2 to 100, preferably about 4 to 50, more preferably about 5 to 30;

a halogen/titanium ratio (by atom) is in the range of about 4 to 100, preferably about 5 to 90, more preferably about 8 to 50;

an organosilicon compound (c)/titanium ratio (by mol) is in the range of about 0.01 to 100, preferably about 0.2 to 10, more preferably about 0.4 to 6; and an organosilicon compound (c)/magnesium ratio (by mol) is in the range of about 0.001 to 0.1, preferably about 0.002 to 0.08, more preferably about 0.005 to 0.05.

The solid titanium catalyst component may further contain other ingredients than the above-mentioned ones, e.g., carrier, and specifically, the other ingredients may be contained in amounts of not more than 50% by weight, preferably not more than 40% by weight, more preferably not more than 30% by weight, particularly preferably not more than 20% by weight.

The composition of the solid titanium catalyst component can be measured by, for example, ICP (atomic absorption spectrometry) or gas chromatography, after the catalyst component is sufficiently washed with a large amount of hexane and dried at room temperature and 0.1 to 1 Torr for not shorter than 2 hours.

The solid titanium catalyst component of the invention is desirably in a granular or spherical shape, and its specific surface area is desirably not less than 10 m²/g, preferably about 100 to 1,000 m²/g.

In the present invention, the solid titanium catalyst component is generally washed with a hydrocarbon solvent prior to use.

Ethylene Polymerization Catalyst

The ethylene polymerization catalyst according to the invention is formed from:

[I] the solid titanium catalyst component, and

[II] an organometallic component.

The organometallic compound used in the invention is preferably an organometallic compound containing a metal selected from Group I to Group III of the periodic table. Examples of such compounds include an organoaluminum compound, an alkyl complex compound of Group I metal and aluminum, and an organometallic compound of Group II metal.

The organoaluminum compound is, for example, a compound represented by the following formula:

$$R^a_n AlX_{3-n}$$

wherein $R^a$ is a hydrocarbon group of 1 to 12 carbon atoms, X is halogen or hydrogen, and n is 1 to 3.

$R^a$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichoride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula:

$$R^a{}_n AlY_{3-n}$$

wherein $R^a$ is the same as above; Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group; n is 1 to 2; $R^b$, $R^c$, $R^d$ and $R^h$ are each methyl, ethyl, isopropyl, isobutyl, cyclohexyl, phenyl or the like; $R^e$ is hydrogen, methyl, ethyl, isopropyl, phenyl, trimethylsilyl or the like; and $R^f$ and $R^g$ are each methyl, ethyl or the like.

Examples of such organoaluminum compounds include:

(i) compounds of the formula $R^a{}_n Al(OR^b)_{3-n}$, e.g., dimethylaluminum methoxide, diethylaluminum ethoxide and diisobutylaluminum methoxide;

(ii) compounds of the formula $R^a{}_n Al(OSiR^c)_{3-n}$, e.g., $Et_2Al(OSiMe_3)$, $(iso-Bu)_2Al(OSiMe_3)$ and $(iso-Bu)_2Al(OSiEt_3)$;

(iii) compounds of the formula $R^a{}_n Al(OAlR^d{}_2)_{3-n}$, e.g., $Et_2AlOAlEt_2$ and $(iso-Bu)_2AlOAl(iso-Bu)_2$;

(iv) compounds of the formula $R^a{}_n Al(NR^e{}_2)_{3-n}$, e.g., $Me_2AlNEt_2$, $Et_2AlNHMe$, $Me_2AlNHEt$, $Et_2AlN(Me_3Si)_2$ and $(iso-Bu)_2AlN(Me_3Si)_2$;

(v) compounds of the formula $R^a{}_n Al(SiR^f{}_3)_{3-n}$, e.g., $(iso-Bu)_2AlSiMe_3$; and (vi) compounds of the formula $R^a{}_n Al[N(R^g)-AlR^h{}_2]_{3-n}$, e.g., $Et_2AlN(Me)-AlEt_2$ and $(iso-Bu)_2AlN(Et)Al(iso-Bu)_2$.

Further, compounds analogous to the above compounds, for example, organoaluminum compounds wherein two or more aluminum atoms are linked through an oxygen atom or a nitrogen atom, are also employable. Examples of such compounds include $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$.

Furthermore, aluminoxanes such as methylaluminoxane are also employable.

The alkyl complex compound of Group I metal and aluminum is, for example, a compound represented by the following formula:

$$M^1 AlR^j{}_4$$

wherein $M^1$ is Li, Na or K, and $R^j$ is a hydrocarbon group of 1 to 15 carbon atoms.

Examples of such compounds include $LiAl(C_2H_5)_4$ and $LiAl(C_7H_{15})_4$.

The organometallic compound of Group II metal is, for example, a compound represented by the following formula:

$$R^k R^1 M^2$$

wherein $R^k$ and $R^1$ are each a hydrocarbon group of 1 to 15 carbon atoms or halogen, $R^k$ and $R^1$ may be the same as or different from each other with the exception that both of them are halogens, and $M^2$ is Mg, Zn or Cd.

Examples of such compounds include diethylzinc, diethylmagnesium, butylethylmagnesium, ethylmagnesium chloride and butylmagnesium chloride.

Of the organoaluminum compounds mentioned above, preferably used are compounds of the formulas $R^a{}_3AlX_{3-n}$, $R^a{}_n Al(OR^b)_{3-n}$ and $R^a{}_n Al(OAlR^d{}_2)_{3-n}$, particularly trialkylaluminums.

The above compounds can be used in combination of two or more kinds.

Olefins may be prepolymerized onto the ethylene polymerization catalyst of the invention.

The ethylene polymerization catalyst of the invention may further contain other components useful for polymerization of ethylene, in addition to the above-mentioned components.

Ethylene Polymerization Process

In the ethylene polymerization process according to the invention, ethylene is polymerized in the presence of the ethylene polymerization catalyst comprising the solid titanium catalyst component [I] and the organometallic compound [II], but ethylene may be copolymerized with a small amount of other olefins.

Examples of the olefins include α-olefins of 3 to 20 carbon atoms, such as propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Further, vinyl compounds, other unsaturated compounds and polyene compounds are also copolymerizable. For example, there can be mentioned:

aromatic vinyl compounds, such as styrene, substituted styrenes, allylbenzene, substituted allylbenzenes, vinylnaphthalenes, substituted vinylnaphthalenes, allylnaphthalenes and substituted allylnaphthalenes;

alicyclic vinyl compounds, such as vinylcyclopentane, substituted vinylcyclopentanes, vinylcyclohexane, substituted vinylcyclohexanes, vinylcycloheptane, substituted vinylcycloheptanes and allylnorbornane;

cycloolefins, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; and unsaturated silane compounds, such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene.

Two or more kinds of the above copolymerizable monomers can be copolymerized with ethylene.

In the ethylene polymerization process of the invention, it is desired that the solid titanium catalyst component [I] is used in an amount of usually about 0.0001 to 1.0 mmol in terms of the titanium atom, based on 1 liter of the polymerization volume, and the organometallic compound [II] is used in such an amount that the amount of the metallic atom in the compound [II] becomes usually about 1 to 2,000 mol, preferably about 5 to 500 mol, based on 1 mol of the titanium atom in the polymerization system.

The polymerization can be carried out as a liquid phase polymerization such as solution polymerization or suspension polymerization, or as a gas phase polymerization.

When a slurry polymerization is used, a polymerization-inactive organic solvent is generally used as a polymerization solvent. Examples of the organic solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride and chlorobenzene. These solvents may be used in combination. Together with the organic solvent, a copolymerizable monomer which is liquid at the reaction temperature is also employable.

The polymerization conditions vary depending on the type of polymerization, the kind of the resulting ethylene polymer, etc., but the polymerization is carried out at a temperature of usually about 20 to 300° C., preferably about 50 to 150° C., under a pressure of usually atmospheric pressure to 100 kg/cm$^2$, preferably about 2 to 50 kg/cm$^2$.

If hydrogen is used in the polymerization process, a molecular weight of the resulting polymer can be modified.

The polymerization can be carried out batchwise, semi-continuously or continuously. Further, the polymerization can be carried out in two or more stages under different reaction conditions.

According to invention, in the polymerization of ethylene, a catalyst is formed using the above-described specific solid titanium catalyst component, and therefore an ethylene polymer having excellent particle properties can be prepared with prominently high polymerization activities. In the resulting ethylene polymer, accordingly, the amount of catalyst residue per polymer unit, particularly halogen content, is small, and hence rusting of mold hardly takes place in the molding process. In addition, an ethylene polymer having a low content of finely divided powder and showing excellent particle properties is obtained, whereby the polymer can be used without being pelletized.

The ethylene polymer obtained by the present invention desirably has a bulk specific gravity of 0.20 to 0.60 g/cc, preferably 0.25 to 0.60 g/cc.

The ethylene polymer desirably has a melt flow rate (MFR, measured in accordance with ASTM D 1238E, 190° C.) of 0.01 to 5,000 g/10 min.

To the ethylene polymer obtained by the invention, additives such as heat stabilizer, weathering stabilizer, antistatic agent, anti-blocking agent, lubricant, nucleating agent, pigment, dye and inorganic or organic filler can be optionally added.

EFFECT OF THE INVENTION

According to the present invention, a solid titanium catalyst component by which an ethylene polymer having a low content of finely divided powder and showing excellent particle properties can be produced in an extremely high yield per catalyst unit, an ethylene polymerization catalyst containing the solid titanium catalyst component and an ethylene polymerization process using the catalyst are provided.

EXAMPLE

The present invention will be further described with reference to the following examples, but it should be construed that the invention is in no way limited to those examples.

In the following examples, composition, particle size and bulk density of the solid titanium catalyst component were measured by the methods described below.

(1) Mg Content, Ti Content

ICP analysis (ICPF 1000TR, manufactured by Shimazu Seisakusho K.K.)

(2) Cl Content

The Cl content was measured by a silver nitrate titration method.

(3) OR Group Content

A catalyst sufficiently dried was added to an acetone solution containing 10% by weight of water, and ROH obtained by hydrolysis was quantitatively determined by gas chromatography.

(4) Particle Size Distribution

The particle size distribution was measured by means of a vibrating machine (low-tap type, manufactured by Iida Seisakusho K.K.) and a sieve (inner diameter: 200 mm, available from Bunsei Furui K.K.).

(5) Bulk Specific Gravity

The bulk specific gravity was measured in accordance with JIS K 6721.

Example 1

Preparation of Solid Titanium Catalyst Component 4.76 Grams (50 mmol) of anhydrous magnesium chloride, 28.1 ml of decane and 16.3 g (125 mmol) of 2-ethylhexyl alcohol were reacted with each other under heating at 130° C. for 3 hours, to give a homogeneous solution. To the solution, 3.1 g (15 mmol) of tetraethoxysilane was added, and they were stirred at 50° C. for 2 hours to dissolve tetraethoxysilane in the solution.

The whole amount of the homogeneous solution obtained above was cooled to room temperature and then dropwise added to 200 ml (1.8 mol) of titanium tetrachloride maintained at 0° C., over a period of 1 hour with stirring. After the dropwise addition was completed, the temperature of the mixture was maintained at 0° C. for 1 hour, then elevated to 110° C. over a period of 1 hour and 45 minutes and maintained at the same temperature for 2 hours with stirring.

After the 2-hour reaction was completed, a solid produced was separated by hot filtration. The solid was sufficiently washed with hexane and decane at 110° C. until any titanium compound liberated in the washing liquid was not detected, to obtain a hexane suspension of a solid titanium catalyst component.

The composition of the solid titanium catalyst component is set forth in Table 2.

Polymerization

Into a 1 liter autoclave was introduced 500 ml of purified n-heptane in an atmosphere of nitrogen. Then, 0.5 mmol of triethylaluminum and 0.005 mmol (in terms of titanium atom) of the hexane suspension of a solid titanium catalyst component were added, and the temperature of the system was elevated to 80° C. To the system, hydrogen was fed so that the pressure became 4.0 kg/cm$^2$-G and then ethylene was continuously fed for 2 hours so that the total pressure became 8.0 kg/cm$^2$-G. The polymerization temperature was maintained at 80° C.

After the polymerization was completed, an ethylene polymer produced was separated from the n-heptane solvent and dried.

After the drying, a powdery polymer was obtained in an yield of 184.9 g. This powdery polymer had MFR of 2.8 g/10 min and an apparent bulk specific gravity of 0.33 g/cc.

The results are set forth in Table 3.

The particle size distribution of the powdery polymer is set forth in Table 1.

TABLE 1

| Particle size | more than 850 μm | 850–500 μm | 500–250 μm | 250–180 μm | 180–100 μm | 100–45 μm | less than 45 μm |
|---|---|---|---|---|---|---|---|
| wt. % | 0.1 | 0.3 | 71.1 | 25.8 | 2.1 | 0.6 | 0 |

Example 2

A catalyst component was prepared in the same manner as in Example 1 except that in the preparation of a catalyst component the reaction time at 110° C. was varied to 1.5 hours from 2 hours. Using the catalyst component, polymerization was carried out in the same manner as in Example 1. The results are set forth in Table 2 and Table 3.

Example 3

A catalyst component was prepared in the same manner as in Example 1 except that in the preparation of a catalyst component the reaction temperature was varied to 105° C. from 110° C. Using the catalyst component, polymerization was carried out in the same manner as in Example 1. The results are set forth in Table 2 and Table 3.

Example 4

A catalyst component was prepared in the same manner as in Example 1 except that in the preparation of a catalyst component the amount of decane was varied to 29.3 ml from 28.1 ml and the amount of 2-ethylhexyl alcohol was varied to 15.3 g (117.5 mmol) from 16.3 g (125 mmol). Using the catalyst component, polymerization was carried out in the same manner as in Example 1. The results are set forth in Table 2 and Table 3.

Example 5

A catalyst component was prepared in the same manner as in Example 1 except that in the preparation of a catalyst component the amount of decane was varied to 37.3 ml from 28.1 ml. Using the catalyst component, polymerization was carried out in the same manner as in Example 1. The results are set forth in Table 2 and Table 3.

Comparative Example 1

Preparation of Solid Titanium Catalyst Component 4.76 Grams (50 mmol) of anhydrous magnesium chloride, 29.3 ml of decane and 15.3 g (117.5 mmol) of 2-ethylhexyl alcohol were reacted with each other under heating at 130° C. for 3 hours, to give a homogeneous solution. To the solution, 0.88 g (5.85 mmol) of ethyl benzoate was added, and they were stirred at 130° C. for 1 hour to dissolve ethyl benzoate in the solution.

The whole amount of the homogeneous solution obtained above was cooled to room temperature and then dropwise added to 200 ml (1.8 mol) of titanium tetrachloride maintained at 0° C., over a period of 1 hour with stirring. After the dropwise addition was completed, the temperature of the mixture was elevated to 80° C. over a period of 1 hour and a half. When the temperature of the mixture reached 80° C., 2.34 g (15.6 mmol) of ethyl benzoate was added, and the resulting mixture was maintained at the same temperature for 2 hours with stirring.

After the 2-hour reaction was completed, a solid produced was separated by hot filtration. The solid was resuspended in 20 ml of titanium tetrachloride and then reacted again under heating at 90° C. for 2 hours. After the reaction was completed, a solid produced was separated again by hot filtration. The solid was sufficiently washed with decane at 110° C. and hexane until any titanium compound liberated in the washing liquid was not detected, to obtain a hexane suspension of a solid titanium catalyst component. The composition of the solid titanium catalyst component is set forth in Table 2.

Then, polymerization was carried out in the same manner as in Example 1 except that the solid titanium catalyst component obtained above was used. The results are set forth in Table 3.

Comparative Example 2

Preparation of Solid Titanium Catalyst Component 7.14 Grams (75 mmol) of anhydrous magnesium chloride, 37.5 ml of decane and 29.3 g (225 mmol) of 2-ethylhexyl alcohol were reacted with each other under heating at 130° C. for 2 hours, to give a homogeneous solution. To the solution, 1.67 g (11.3 mmol) of phthalic anhydride was added, and they were stirred at 130° C. for 1 hour to dissolve phthalic anhydride in the solution.

The whole amount of the homogeneous solution obtained above was cooled to room temperature and then dropwise added to 200 ml (1.8 mol) of titanium tetrachloride maintained at –20° C., over a period of 1 hour. After the dropwise addition was completed, the temperature of the mixture was elevated to 110° C. over a period of 4 hours and maintained at the same temperature for 2 hours with stirring.

After the 2-hour reaction was completed, a solid produced was separated by hot filtration. The solid was resuspended in 200 ml of titanium tetrachloride and then reacted again under heating at 110° C. for 2 hours. After the reaction was completed, a solid produced was separated again by hot filtration. The solid was sufficiently washed with hexane and decane at 110° C. until any titanium compound liberated in the washing liquid was not detected, to obtain a hexane suspension of a solid titanium catalyst component. The composition of the solid titanium catalyst component is set forth in Table 2.

Then, polymerization was carried out in the same manner as in Example 1 except that the solid titanium catalyst component obtained above was used. The results are set forth in Table 3.

Comparative Example 3

Preparation of Solid Titanium Catalyst Component

In a 400 ml four-necked flask, 2.86 g (30 mmol) of anhydrous magnesium chloride was suspended in 150 ml of decane. To the suspension, 8.3 g (180 mmol) of ethanol was dropwise added over a period of 1 hour with stirring, followed by performing reaction at room temperature for 1 hour. Then, 10.1 g (84 mmol) of diethylaluminum monochloride was dropwise added at room temperature to perform reaction at 30° C. for 1 hour.

Subsequently, 56.9 g (300 mmol) of titanium tetrachloride was added. The resulting mixture was heated and stirred at 80° C. for 3 hours.

After the reaction was completed, a solid produced was separated from the liquid phase. The solid was sufficiently washed with hexane until any titanium compound liberated in the washing liquid was not detected, to obtain a hexane suspension of a solid titanium catalyst component. The composition of the solid titanium catalyst component is set forth in Table 2.

Then, polymerization was carried out in the same manner as in Example 1 except that the solid titanium catalyst component obtained above was used. The results are set forth in Table 3.

Comparative Example 4

A solid titanium catalyst component was prepared in the same manner as in Example 1 except that in the preparation of a solid titanium catalyst component the temperature after the contact of the magnesium solution and the titanium tetrachloride (the temperature elevated) was varied to 90° C. from 110° C.

The composition of the solid titanium catalyst component is set forth in Table 2.

Then, polymerization was carried out in the same manner as in Example 1 except that the solid titanium catalyst component obtained above was used.

As a result, a powdery ethylene polymer was obtained in an yield of 76.1 g. This powdery ethylene polymer had MFR of 2.4 g/10 min and an apparent bulk specific gravity of 0.31 g/cc. The results are set forth in Table 3.

Comparative Example 5

A solid titanium catalyst component was prepared in the same manner as in Example 1 except that the temperature after the contact of the magnesium solution and the titanium tetrachloride (the temperature elevated) was varied to 120° C. from 110° C. Using the solid titanium catalyst component, polymerization was carried out in the same manner as in Example 1.

The results are set forth in Table 2 and Table 3.

Comparative Example 6

A catalyst component was prepared in the same manner as in Example 1 except that in the preparation of a catalyst component the amount of tetraethoxysilane was varied to 2.1 g (10 mmol) from 3.1 g (15 mmol). Using the catalyst component, polymerization was carried out in the same manner as in Example 1. The results are set forth in Table 2 and Table 3.

Comparative Example 7

A catalyst component was prepared in the same manner as in Example 1 except that in the preparation of a catalyst component the amount of tetraethoxysilane was varied to 4.2 g (20 mmol) from 3.1 g (15 mmol). Using the catalyst component, polymerization was carried out in the same manner as in Example 1. The results are set forth in Table 2 and Table 3.

Comparative Example 8

A catalyst component was prepared in the same manner as in Example 1 except that in the preparation of a catalyst component the amount of tetraethoxysilane was varied to 2.1 g (10 mmol) from 3.1 g (15 mmol) and the temperature after the contact of the magnesium solution and the titanium tetrachloride (the temperature elevated) was varied to 90° C. from 110° C. Using the catalyst component, polymerization was carried out in the same manner as in Example 1. The results are set forth in Table 2 and Table 3.

TABLE 2

| | Composition of catalyst (% by weight) | | | | | |
| --- | --- | --- | --- | --- | --- | --- |
| | Ti | Mg | Cl | Si | OEt[*1] | OEH[*2] |
| Ex. 1 | 6.5 | 16.0 | 62.0 | 0.2 | 1.0 | 3.2 |
| Ex. 2 | 7.1 | 15.0 | 61.0 | 0.2 | 2.4 | 4.0 |
| Ex. 3 | 7.5 | 15.0 | 60.0 | 0.3 | 2.8 | 5.1 |
| Ex. 4 | 6.7 | 15.5 | 60.0 | 0.2 | 2.0 | 2.7 |
| Ex. 5 | 6.5 | 16.0 | 61.0 | 0.2 | 2.0 | 3.2 |
| Comp. Ex. 1 | 3.3 | 17.0 | 60.0 | — | — | 1.4 |
| Comp. Ex. 2 | 2.2 | 19.0 | 60.0 | — | — | 0.1 |
| Comp. Ex. 3 | 5.1 | 16.0 | 61.0 | — | 10.0 | — |
| Comp. Ex. 4 | 9.6 | 13.0 | 60.0 | 0.6 | 4.8 | 11.3 |
| Comp. Ex. 5 | 6.0 | 17.0 | 65.0 | 0.2 | ≦0.1 | 2.5 |
| Comp. Ex. 6 | 6.7 | 16.0 | 62.0 | 0.1 | 0.5 | 3.2 |
| Comp. Ex. 7 | 6.6 | 16.0 | 62.0 | 0.3 | 2.7 | 3.4 |
| Comp. Ex. 8 | 10.1 | 12.0 | 60.0 | 0.2 | 3.0 | 12.0 |

OEt[*1]: ethoxy group,
OEH[*2]: 2-ethylhexoxy group

TABLE 3

| | Results of polymerization | | |
| --- | --- | --- | --- |
| | Activity g-PE/g-catalyst | MFR g/10 min | Bulk specific gravity g/cc |
| Ex. 1 | 50,100 | 2.8 | 0.33 |
| Ex. 2 | 49,700 | 2.8 | 0.32 |
| Ex. 3 | 49,500 | 3.6 | 0.32 |
| Ex. 4 | 44,800 | 3.1 | 0.29 |
| Ex. 5 | 52,800 | 3.0 | 0.31 |
| Comp. Ex. 1 | 12,000 | 2.1 | 0.35 |
| Comp. Ex. 2 | 1,900 | 3.3 | 0.29 |
| Comp. Ex. 3 | 31,900 | 2.5 | 0.34 |
| Comp. Ex. 4 | 30,400 | 2.4 | 0.31 |
| Comp. Ex. 5 | 31,700 | 2.2 | 0.29 |
| Comp. Ex. 6 | 41,100 | 2.8 | 0.34 |
| Comp. Ex. 7 | 52,900 | 4.2 | 0.30 |
| Comp. Ex. 8 | 26,200 | 2.9 | 0.30 |

| | Results of polymerization Particle size distribution (% By weight) | | |
| --- | --- | --- | --- |
| | >500 μm | 100–500 μm | <100 μm |
| Ex. 1 | 0.4 | 99.0 | 0.6 |
| Ex. 2 | 1.3 | 97.9 | 0.8 |
| Ex. 3 | 2.6 | 96.5 | 0.9 |
| Ex. 4 | 4.3 | 94.2 | 1.5 |
| Ex. 5 | 2.9 | 95.6 | 1.5 |
| Comp. Ex. 1 | 4.1 | 91.3 | 4.6 |
| Comp. Ex. 2 | 1.0 | 91.5 | 7.5 |
| Comp. Ex. 3 | 2.3 | 81.4 | 16.3 |
| Comp. Ex. 4 | 4.0 | 94.8 | 1.3 |
| Comp. Ex. 5 | 0.9 | 98.7 | 0.5 |
| Comp. Ex. 6 | 2.1 | 96.0 | 1.9 |
| Comp. Ex. 7 | 1.0 | 96.4 | 2.7 |
| Comp. Ex. 8 | 2.5 | 95.1 | 2.5 |

Example 6

Preparation of Solid Titanium Catalyst Component 4.76 Grams (50 mmol) of anhydrous magnesium chloride, 28.1 ml of decane and 16.3 g (125 mmol) of 2-ethylhexyl alcohol were reacted with each other under heating at 130° C. for 3 hours, to give a homogeneous solution. To the solution, 3.1 g (15 mmol) of tetraethoxysilane was added, and they were stirred at 50° C. for 2 hours to dissolve tetraethoxysilane in the solution.

The whole amount of the homogeneous solution obtained above was cooled to room temperature and then dropwise added to 200 ml (1.8 mol) of titanium tetrachloride maintained at 0° C., over a period of 1 hour with stirring. After the dropwise addition was completed, the temperature of the mixture was maintained at 0° C. for 1 hour and then elevated to 110° C. over a period of 1 hour and 45 minutes. When the temperature of the mixture reached 110° C., 1.0 g (5 mmol) of tetraethoxysilane was added.

The mixture was further stirred at 110° C. for 2 hours. After the 2-hour reaction was completed, a solid produced was separated by hot filtration. The solid was sufficiently washed with hexane and decane at 110° C. until any titanium compound liberated in the washing liquid was not detected, to obtain a hexane suspension of a solid titanium catalyst component. The composition of the solid titanium catalyst component is set forth in Table 4.

Polymerization

Into a 1 liter autoclave was introduced 500 ml of purified n-heptane in an atmosphere of nitrogen. Then, 0.5 mmol of triethylaluminum and 0.005 mmol (in terms of titanium atom) of the hexane suspension of a solid titanium catalyst component were added, and the temperature of the system was elevated to 80° C. To the system, hydrogen was fed so that the pressure became 4.0 kg/cm$^2$-G and then ethylene was continuously fed for 2 hours so that the total pressure became 8.0 kg/cm$^2$-G. The polymerization temperature was maintained at 80° C.

After the polymerization was completed, an ethylene polymer produced was separated from the n-heptane solvent and dried.

The results are set forth in table 5.

Example 7

A catalyst component was prepared in the same manner as in Example 6 except that the amount of tetraethoxysilane (second addition) added when the temperature reached 110° C. was varied to 2.1 g (10 mmol) from 1.0 g (5 mmol). Using the catalyst component, polymerization was carried out in the same manner as in Example 6. The results are set forth in Table 4 and Table 5.

Comparative Example 9

A catalyst component was prepared in the same manner as in Example 7 except that the temperature elevated in the preparation of a catalyst component was varied to 120° C. from 110° C. and the second addition of tetraethoxysilane was carried out when the temperature reached 120° C. Using the catalyst component, polymerization was carried out in the same manner as in Example 7. The results are set forth in Table 4 and Table 5.

Comparative Example 10

A catalyst component was prepared in the same manner as in Example 7 except that the temperature elevated in the preparation of a catalyst component was varied to 90° C. from 110° C. and the second addition of tetraethoxysilane was carried out when the temperature reached 90° C. Using the catalyst component, polymerization was carried out in the same manner as in Example 7. The results are set forth in Table 4 and Table 5.

TABLE 4

| | Composition of catalyst (% by weight) | | | | | |
|---|---|---|---|---|---|---|
| | Ti | Mg | Cl | Si | OEt | OEH |
| Ex. 6 | 6.6 | 16.0 | 63.0 | 0.2 | 2.7 | 3.5 |
| Ex. 7 | 6.6 | 15.0 | 63.0 | 0.3 | 3.0 | 3.9 |
| Comp. Ex. 9 | 6.0 | 16.0 | 65.0 | 0.1 | 1.0 | 2.2 |
| Comp. Ex. 10 | 9.8 | 13.0 | 60.0 | 0.6 | 5.2 | 12.5 |

TABLE 5

| | Results of polymerization | | |
|---|---|---|---|
| | Activity g-PE/g-catalyst | MFR g/10 min | Bulk specific gravity g/cc |
| Ex. 6 | 52,900 | 4.4 | 0.33 |
| Ex. 7 | 54,600 | 4.0 | 0.32 |
| Comp. Ex. 9 | 33,300 | 3.5 | 0.29 |
| Comp. Ex. 10 | 32,500 | 3.8 | 0.30 |
| | Results of polymerization Particle size distribution (% By weight) | | |
| | >500 μm | 100–500 μm | <100 μm |
| Ex. 6 | 1.0 | 98.6 | 0.5 |
| Ex. 7 | 1.6 | 97.9 | 0.6 |
| Comp. Ex. 9 | 2.9 | 96.5 | 0.6 |
| Comp. Ex. 10 | 3.8 | 94.8 | 1.5 |

What is claimed is:

1. A solid titanium catalyst component being obtained by a process comprising:
   a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and
   a step of elevating the temperature of the resulting contact product (i) to a temperature of 105 to 115° C. and maintaining the contact product (i) at this temperature,
   said solid titanium catalyst component comprising magnesium, titanium, halogen and the organosilicon compound having no active hydrogen (c), having a catalytic activity of 44,800 g-polymer/g-catalyst and a ratio of powdery polymer having a particle size of less than 100 μm of 1.5% by weight or below when used to polymerize ethylene for 2 hours at a temperature of 80° C. and a partial pressure of ethylene of 4.0 kg/cm$^2$-G.

2. A solid titanium catalyst component being obtained by a process comprising:
   a step of bridging (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and
   a step of elevating the temperature of the resulting contact product (i) to maintain the contact product (i) at a given temperature (T1) of 105 to 115° C., to which additional organosilicon compound having no active hydrogen (c) is added in an amount of not more than 0.5 mol based on 1 mol of the magnesium compound (a) during the elevation of the temperature from T1—10° C. to T1, or after the completion of the temperature elevation, so as to bring the compound (c) into contact with the contact product (i), said solid titanium catalyst component comprising magnesium, titanium, halogen and the organosilicon compound having no active hydrogen (c), and having a catalytic activity of 52,900 g-polymer/g-catalyst and a ratio of powdery polymer having a particle size of less than 100 μm of 0.6% by weight or below when used to polymerize ethylene for 2 hours at a temperature of 80° C. and a partial pressure of ethylene of 4.0 kg/cm$^2$-G.

3. An ethylene polymerization catalyst comprising:

[I] the solid titanium catalyst component as claimed in any one of claims 1 and 2, and

[II] an organometallic compound.

4. An ethylene polymerization process comprising polymerizing ethylene or copolymerizing ethylene and a comonomer in the presence of the catalyst as claimed in claim 3.

5. A solid titanium catalyst component being obtained by a process comprising:

a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and a step of elevating the temperature of the resulting contact product (i) to a temperature of 105 to 115° C. and maintaining the contact product (i) at this temperature, said solid titanium catalyst component comprising magnesium, titanium, halogen and the organosilicon compound having no active hydrogen (c), having a catalytic activity of 49,500 g-polymer/g-catalyst and a ratio of powdery polymer having a particle size of less than 100 μm of 1.5% by weight or below when used to polymerize ethylene for 2 hours at a temperature of 80° C. and a partial pressure of ethylene of 4.0 kg/cm$^2$-G.

6. A solid titanium catalyst component being obtained by a process comprising:

a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and a step of elevating the temperature of the resulting contact product (i) to a temperature of 105 to 115° C. and maintaining the contact product (i) at this temperature, said solid titanium catalyst component comprising magnesium, titanium, halogen and the organosilicon compound having no active hydrogen (c), having a catalytic activity of 49,700 g-polymer/g-catalyst and a ratio of powdery polymer having a particle size of less than 100 μm of 1.5% by weight or below when used to polymerize ethylene for 2 hours at a temperature of 80° C. and a partial pressure of ethylene of 4.0 kg/cm$^2$-G.

7. A solid titanium catalyst component being obtained by a process comprising:

a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and a step of elevating the temperature of the resulting contact product (i) to a temperature of 105 to 115° C. and maintaining the contact product (i) at this temperature, said solid titanium catalyst component comprising magnesium, titanium, halogen and the organosilicon compound having no active hydrogen (c), having a catalytic activity of 50,100 g-polymer/g-catalyst and a ratio of powdery polymer having a particle size of less than 100 μm of 1.5% by weight or below when used to polymerize ethylene for 2 hours at a temperature of 80° C. and a partial pressure of ethylene of 4.0 kg/cm$^2$-G.

8. A solid titanium catalyst component being obtained by a process comprising:

a step of bringing (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and a step of elevating the temperature of the resulting contact product (i) to a temperature of 105 to 115° C. and maintaining the contact product (i) at this temperature, said solid titanium catalyst component comprising magnesium, titanium, halogen and the organosilicon compound having no active hydrogen (c), having a catalytic activity of 52,800 g-polymer/g-catalyst and a ratio of powdery polymer having a particle size of less than 100 μm of 1.5% by weight or below when used to polymerize ethylene for 2 hours at a temperature of 80° C. and a partial pressure of ethylene of 4.0 kg/cm$^2$-G.

9. A solid titanium catalyst component being obtained by a process comprising:

a step of bridging (a) a liquid magnesium compound into contact with (b) a liquid titanium compound in the presence of (c) an organosilicon compound having no active hydrogen in an amount of 0.25 to 0.35 mol based on 1 mol of the magnesium compound (a); and a step of elevating the temperature of the resulting contact product (i) to maintain the contact product (i) as a given temperature (T1) of 105 to 115° C., to which additional organosilicon compound having no active hydrogen (c) is added in an amount of not more than 0.5 mol based on 1 mol of the magnesium compound (a) during the elevation, of the temperature from T1—10° C. to T1, or after the completion of the temperature elevation, so as to bring the compound (c) into contact with the contact product (i), said solid titanium catalyst component comprising magnesium, titanium, halogen and the organosilicon compound having no active hydrogen (c), and having a catalytic activity of 54,600 g-polymer/g-catalyst and a ratio of powdery polymer having a particle size of less than 100 μm of 0.6% by weight or below when used to polymerize ethylene for 2 hours at a temperature of 80° C. and a partial pressure of ethylene of 4.0 kg/cm$^2$-G.

* * * * *